United States Patent
Tamaura (10) Patent No.: US 9,372,013 B2
(45) Date of Patent: Jun. 21, 2016

(54) METHOD AND SYSTEM FOR STORING SOLAR HEAT

(75) Inventor: Yutaka Tamaura, Tokyo (JP)

(73) Assignee: Tokyo Institute of Technology (JP)

( * ) Notice: Subject to any disclaimer, the term of this patent is extended or adjusted under 35 U.S.C. 154(b) by 596 days.

(21) Appl. No.: 13/884,038

(22) PCT Filed: Nov. 8, 2011

(86) PCT No.: PCT/JP2011/075761
§ 371 (c)(1),
(2), (4) Date: May 8, 2013

(87) PCT Pub. No.: WO2012/063838
PCT Pub. Date: May 18, 2012

(65) Prior Publication Data
US 2013/0269681 A1  Oct. 17, 2013

Related U.S. Application Data (60) Provisional application No. 61/411,249, filed on Nov. 8, 2010.

(51) Int. Cl.
*F24J 2/34* (2006.01)
*F24J 2/07* (2006.01)
(Continued)

(52) U.S. Cl.
CPC ............... *F24J 2/34* (2013.01); *C04B 35/2666* (2013.01); *F24J 2/07* (2013.01); *F24J 2/484* (2013.01);
(Continued)

(58) Field of Classification Search
CPC .................. F24J 2/34; F24J 2/07; F24J 2/484; F24J 2002/075; C04B 35/2666; C04B 2235/3279; C04B 2235/9607; C04B 2235/9646; F28D 20/003; F28D 20/0056; F28D 2020/0047; Y02E 10/41; Y02E 60/142; Y02E 70/30
See application file for complete search history.

(56) References Cited

U.S. PATENT DOCUMENTS

| 4,942,736 A | 7/1990 | Bronicki |
| 2008/0086946 A1 | 4/2008 | Weimer et al. |

(Continued)

FOREIGN PATENT DOCUMENTS

| CN | 1776322 A | 5/2006 |
| CN | 101737957 A | 6/2010 |

(Continued)

OTHER PUBLICATIONS

Chinese Office Action for Chinese Patent Application No. 201180050549.6 (mailed Mar. 11, 2015).
(Continued)

*Primary Examiner* — Alfred Basichas
(74) *Attorney, Agent, or Firm* — Merchant & Gould P.C.

(57) ABSTRACT

The invention provides a solar thermal storage method capable of supplying heat of about 1000-1300 K to an external facility for 24 hours. Disclosed is a solar thermal storage method for storing heat using solar light energy, comprising a concentrated beam irradiation step S1 of irradiating a reactive ceramics layer with a concentrated beam obtained by concentrating solar light to heat the same while moving the reactive ceramics layer formed using reactive ceramics that transforms from an oxidized form to a reduced form with a release of oxygen when heated and returns to the oxidized form when brought into contact with the oxygen; and a thermal storage step S2 of storing the heat emitted from the reactive ceramics layer in thermal storage means while bringing the reactive ceramics layer heated in the concentrated beam irradiation step S1 into contact with gas containing the oxygen.

9 Claims, 6 Drawing Sheets (51) Int. Cl.
  *F24J 2/48* (2006.01)
  *C04B 35/26* (2006.01)
  *F28D 20/00* (2006.01)

(52) U.S. Cl.
  CPC ....... *F28D 20/003* (2013.01); *C04B 2235/3279* (2013.01); *C04B 2235/9607* (2013.01); *C04B 2235/9646* (2013.01); *F24J 2002/075* (2013.01); *F28D 20/0056* (2013.01); *F28D 2020/0047* (2013.01); *Y02E 10/41* (2013.01); *Y02E 60/142* (2013.01); *Y02E 70/30* (2013.01)

(56) References Cited

U.S. PATENT DOCUMENTS

2009/0322089 A1  12/2009  Mills
2010/0215897 A1  8/2010  Weimer et al.

FOREIGN PATENT DOCUMENTS

| | | |
|---|---|---|
| JP | A-02-275255 | 11/1990 |
| JP | A-2006-064356 | 3/2006 |
| JP | 2009-263165 | 11/2009 |
| JP | A-2010-054058 | 3/2010 |
| JP | A-2010-132845 | 6/2010 |
| WO | WO-2006/025449 A1 | 3/2006 |

OTHER PUBLICATIONS

International Search Report for International Patent Application No. PCT/JP2011/075761 (mailed Feb. 28, 2012).

Epstein et al. "A molten salt system with a ground base-integrated solar receiver storage tank," *J. Phys. IV France*, vol. 9, pp. 95-104 (1999).

Chinese Office Action for Chinese Patent Application No. 201180050549.6 (mailed Aug. 4, 2014).

Extended European Search Report for European Patent Application No. 11 83 9351 (mailed Oct. 10, 2014).

PRIOR ART

METHOD AND SYSTEM FOR STORING SOLAR HEAT

This application is a U.S. National Stage Application under 35 U.S.C. §371 of International Patent Application No. PCT/JP2011/075761 filed 8 Nov. 2011, which claims the benefit of priority to U.S. Provisional Patent Application No. 61/411,249 filed 8 Nov. 2010, the disclosures of all of which are hereby incorporated by reference in their entireties. The International Application was published in Japanese on 18 May 2012 as WO 2012/063838.

TECHNICAL FIELD

The present invention relates to a solar thermal storage method and a system for storing heat using solar light energy.

BACKGROUND ART

In recent years, there has been a growing interest in power generation using renewable energy such as solar light and wind power from the viewpoint of global environmental protection. However, since such renewable energy decreases stability due to its dependence on weather conditions or the like, it appears to be difficult for the renewable energy to play a role as a base power source.

Conversely, solar power using solar heat generates power in such a manner that it concentrates solar light with a lens and rotates a turbine with steam generated by heat resulting from the concentration of the solar light. That is, provided that solar light strongly beats down at all times, it is possible to generate power stably and inexpensively. For this reason, countries having desert regions and dry regions have promoted the introduction of the solar power generation, and there has been a growing demand for solar thermal energy excellent in cost-effectiveness and reliability on an international basis.

The storage of solar thermal energy is a recommended technology for responding to the demand for solar thermal energy excellent in cost-effectiveness and reliability since the thermal energy concentrated in a concentrated solar power (CSP) system can be directly stored without the need to transform the solar thermal energy to another energy form. Note that the thermal energy can be stored in an insulated container and collected through a heat engine or the like that generates electricity (i.e., it can be transformed to electric energy).

As for solar power, Patent Literature 1, e.g., proposes a solar light heat collector that collects solar thermal energy with high efficiency and high quality and stores the same in a heating medium, a solar light concentrating reflector, a solar light concentrating system, and a solar light energy using system, each using the solar light heat collector.

In addition, Patent Literature 1 discloses a beam-down solar light concentrating system as a system that concentrates solar light. Note that the beam-down solar light concentrating system is also disclosed in Non-Patent Literature 1.

Figure 6:
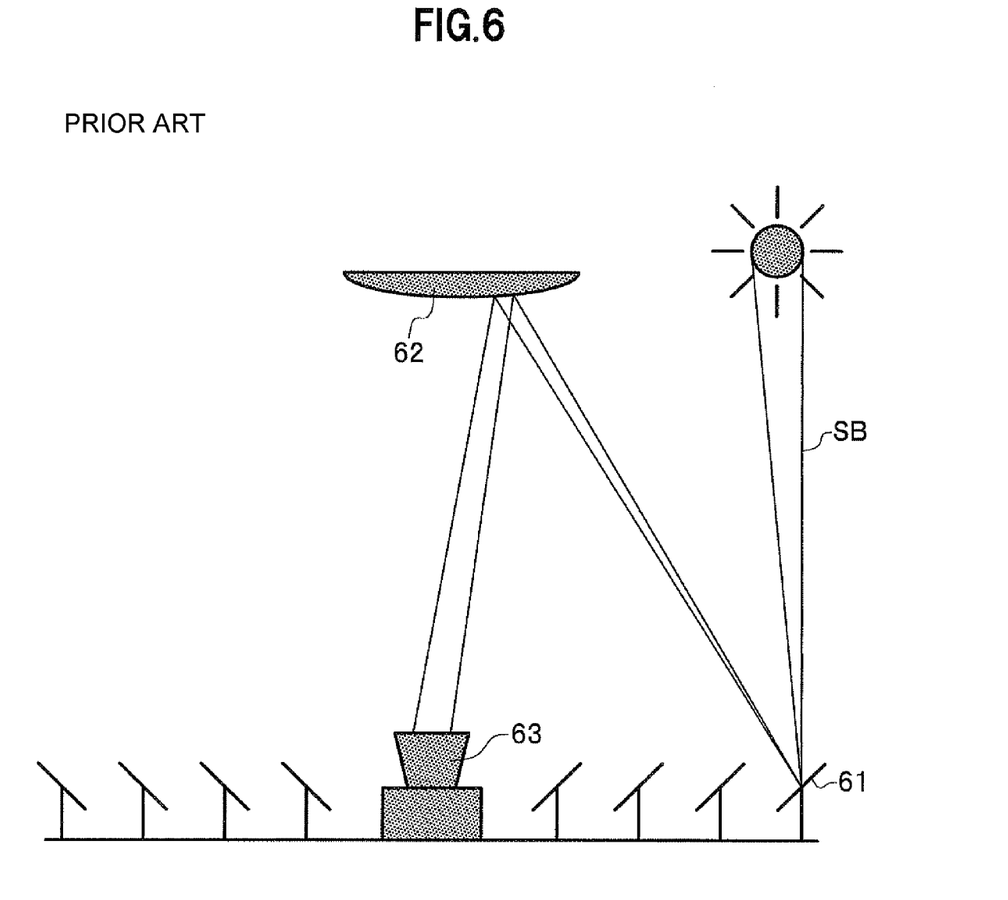
FIG. 6 is a conceptual diagram for explaining a conventional example of a beam-down solar light concentrating system.

Here, as shown in FIG. 6, the beam-down solar light concentrating system refers to a system in which a plurality of reflecting mirrors (heliostats) 61 is arranged on the ground and the reflection light of solar light SB reflected by the plurality of heliostats 61 is reflected downward by a light concentrating reflecting mirror 62 provided at a high place and concentrated into a heat collector 63.

PRIOR ART REFERENCE

Patent Literature

Patent Literature 1: WO 2006/025449

Non-Patent Literature

Non-Patent Literature 1: "A molten salt system with a ground base-integrated solar receiver storage tank" by E. Epstein, A. Segal and A. Yogev, J. Phys. IV France 9, 95-104 (1999)

SUMMARY OF THE INVENTION

Problems to be Solved by the Invention

The beam-down solar light concentrating system disclosed in Patent Literature 1 and Non-Patent Literature 1 gives rise to the problem that it can concentrate solar light and supply the heat of about 1000 to 1300 Kelvin (K) (about 700 to 1000° C.) to an external facility or construction (hereinafter referred to as external facility) during the daytime, but cannot supply the heat of such high temperature to the external facility for a long period of time (e.g., 12 hours) during the nighttime since the heat is stored in a heating medium (molten salt) that circulates inside a pipe.

In addition, a heat generation rate using a high flux concentrated beam is faster than a thermal conductivity rate to a thermal storage material. Therefore, in a case in which heat is stored in a heating medium as in Patent Literature 1, it is really difficult to balance the heat generation rate and the thermal conductivity rate. This problem can be solved by, e.g., the circulation of the heating medium at a very fast speed, but the method is not preferable since the facility becomes complex and larger and the heat efficiency is reduced.

The present invention has been made in view of the above circumstances and has an object of providing a solar thermal storage method and a system capable of supplying the heat of about 1000 to 1300 K to an external facility for 24 hours with a simple configuration.

Means for Solving the Problem

In order to achieve the above object, the present invention provides a solar thermal storage method for storing heat using solar light energy, the solar thermal storage method including a concentrated beam irradiation step of irradiating a reactive ceramics layer with a concentrated beam obtained by concentrating solar light to heat the same while moving the reactive ceramics layer formed using reactive ceramics that transforms from an oxidized form to a reduced form with a release of oxygen when heated and returns to the oxidized form when brought into contact with the oxygen; and a thermal storage step of storing the heat emitted from the reactive ceramics layer in thermal storage means while bringing the reactive ceramics layer heated in the concentrated beam irradiation step into contact with gas containing the oxygen.

The present invention preferably includes a heat extraction step of circulating a heating medium to extract the heat stored in the thermal storage means to an outside of the thermal storage means after the thermal storage step.

In addition, the present invention provides a solar thermal storage system for storing heat using solar light energy, the solar thermal storage system including a rotation body having a reactive ceramics layer formed on a front surface thereof, the reactive ceramics layer being formed using reactive ceramics that transforms from an oxidized form to a reduced form with a release of oxygen when heated; drive means for rotating the rotation body in a peripheral direction; a heat insulation member provided so as to cover an outer peripheral surface of the rotation body and having an opening part that allows the rotation body to be irradiated with a concentrated beam obtained by concentrating solar light; thermal storage means provided close to the rotation body at a position distant from the opening part; and gas supply means for supplying gas containing the oxygen to the rotation body, the gas supply means being provided any position in a middle of an interval until the rotating rotation body reaches the thermal storage means after passing through the opening part.

In the present invention, the reactive ceramics layer is preferably formed of nickel ferrite.

In addition, in the present invention, the thermal storage means preferably includes heat extraction means for circulating a heating medium to extract the heat stored in the thermal storage means to an outside of the thermal storage means.

Moreover, in the present invention, the rotation body is preferably a cylindrical body formed of alumina fibers.

In the present invention, the thermal storage means is preferably formed using a thermal storage material formed of at least one of a carbon material and salt.

Effect of the Invention

According to the present invention, it is possible to provide a solar thermal storage method capable of supplying the heat of about 1000 to 1300 K to an external facility for 24 hours.

In addition, according to the present invention, it is possible to provide a solar thermal storage system capable of supplying the heat of about 1000 to 1300 K to an external facility for 24 hours.

EMBODIMENTS FOR CARRYING OUT THE INVENTION

Hereinafter, referring to the drawings as required, a description will be given in detail of modes (embodiments) for carrying out the present invention.

[Solar Thermal Storage Method]

Figure 1:
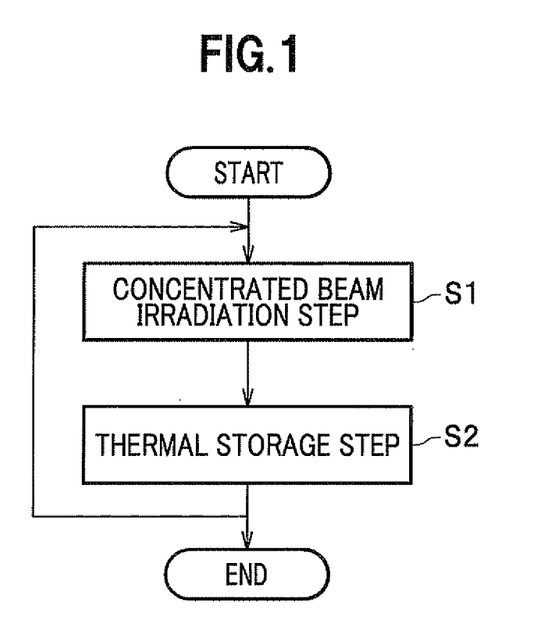
FIG. 1 is a flowchart showing the flow of a solar thermal storage method according to an embodiment of the present invention.

Referring to FIG. 1, a description will be first given of an embodiment of a solar thermal storage method according to the present invention. As shown in FIG. 1, the solar thermal storage method according to the embodiment of the present invention includes a concentrated beam irradiation step S1 and a thermal storage step S2.

(Concentrated Beam Irradiation Step)

The concentrated beam irradiation step S1 refers to the step of irradiating a reactive ceramics layer with a concentrated beam obtained by concentrating solar light to heat the same while moving the reactive ceramics layer formed using reactive ceramics that transforms from an oxidized form to a reduced form with the release of oxygen when heated and returns to the oxidized form when brought into contact with the oxygen.

Examples of means for obtaining the concentrated beam can include a plurality of heliostats and a beam-down solar light concentrating system that reflects light reflected by the heliostats downward via a light concentrating reflection mirror provided at a high place. Specifically, the means is described in WO 2006/025449 and "A molten salt system with a ground base-integrated solar receiver storage tank" by E. Epstein, A. Segal and A. Yogev, J. Phys. IV France 9, 95-104 (1999). Note that the means for obtaining the concentrated beam is not limited to them but can include, e.g., a concentrating lens.

The concentrated beam obtained by the above means has a high flux of about 1300 to 2000 kW/m$^2$. With the concentrated beam of such a high flux, the reactive ceramics layer 21 can be heated to about 1800 K as will be described later, and the heat can be stored in thermal storage means as will be described later.

Examples of the reactive ceramics can include ferric oxide ceramics. Specifically, examples of the reactive ceramics can include ferrite. More specifically, examples of the reactive ceramics can include spinel ferrite (AFe$_2$O$_4$ (where A represents one of Mn, Co, Ni, Cu, and Zn)). Particularly, NiFe$_2$O$_4$ (Ni-ferrite, nickel ferrite) can be most suitably used. In addition, Mn$_2$O$_3$ (manganese oxide), Co$_3$O$_4$ (cobalt oxide), or the like can also be used.

The reactive ceramics layer can be moved by any means. For example, a reactive ceramics layer formed using the reactive ceramics is formed on the outer peripheral surface of a cylindrical rotation body, and the rotation body is rotated by drive means such as a motor. In this manner, the reactive ceramics layer can be moved as described above.

(Thermal Storage Step)

The subsequent thermal storage step S2 refers to the step of storing heat emitted from the reactive ceramics layer in the thermal storage means while bringing the reactive ceramics layer heated in the concentrated beam irradiation step S1 into contact with gas containing oxygen.

Note that the reactive ceramics layer is continuously moved even in the thermal storage step S2.

The gas containing oxygen may be any substance containing oxygen. For example, air can be used as such. Note that oxygen gas having a high concentration of oxygen supplied from an oxygen cylinder or the like can also be used alone or in combination with air at any proportion.

The thermal storage means is preferably formed using a thermal storage material formed of at least one of, e.g., a carbon material and salt. Examples of the carbon material can include graphite, a carbon composite, or the like. In addition, examples of the salt can include NaCl, rock salt, or the like. Note that in the case of using the carbon material, the carbon material is not preferably in contact with oxygen to prevent combustion. In order to realize this, for example, a sealed vessel that accommodates the carbon material is evacuated or filled with an inert gas such as helium and argon.

As will be described later, the thermal storage means is preferably provided so as to have a slight gap between the thermal storage means and the reactive ceramics layer. In this case, the heat transfer from the reactive ceramics layer to the thermal storage means is performed by the radiation of the heat from the reactive ceramics layer and the convection of the air generated between the reactive ceramics layer and the thermal storage means.

After the heat transfer to the thermal storage means in the thermal storage step S2, the process returns to the concentrated beam irradiation step S1 to repeatedly perform the same operations. Thus, the solar heat can be continuously and efficiently stored in the thermal storage means. In addition, if the capacity of the thermal storage means is appropriately controlled, the thermal storage means can store the heat with a heat amount that allows the supply of the heat to an external facility during the nighttime (for about 12 hours) at which solar light cannot be obtained.

The solar thermal storage method according to the embodiment described above preferably further includes a heat extraction step.

(Heat Extraction Step)

The heat extraction step (not shown in FIG. 1) refers to the step of circulating a heating medium to extract the heat stored in the thermal storage means to the outside of the thermal storage means, i.e., an external facility. The step can be realized by the heat exchange between the thermal storage means and the external facility, and the heat of about 1000 to 1300 K can be supplied to the external facility.

(Outline of Reaction and Heat Transfer)

Figure 2:
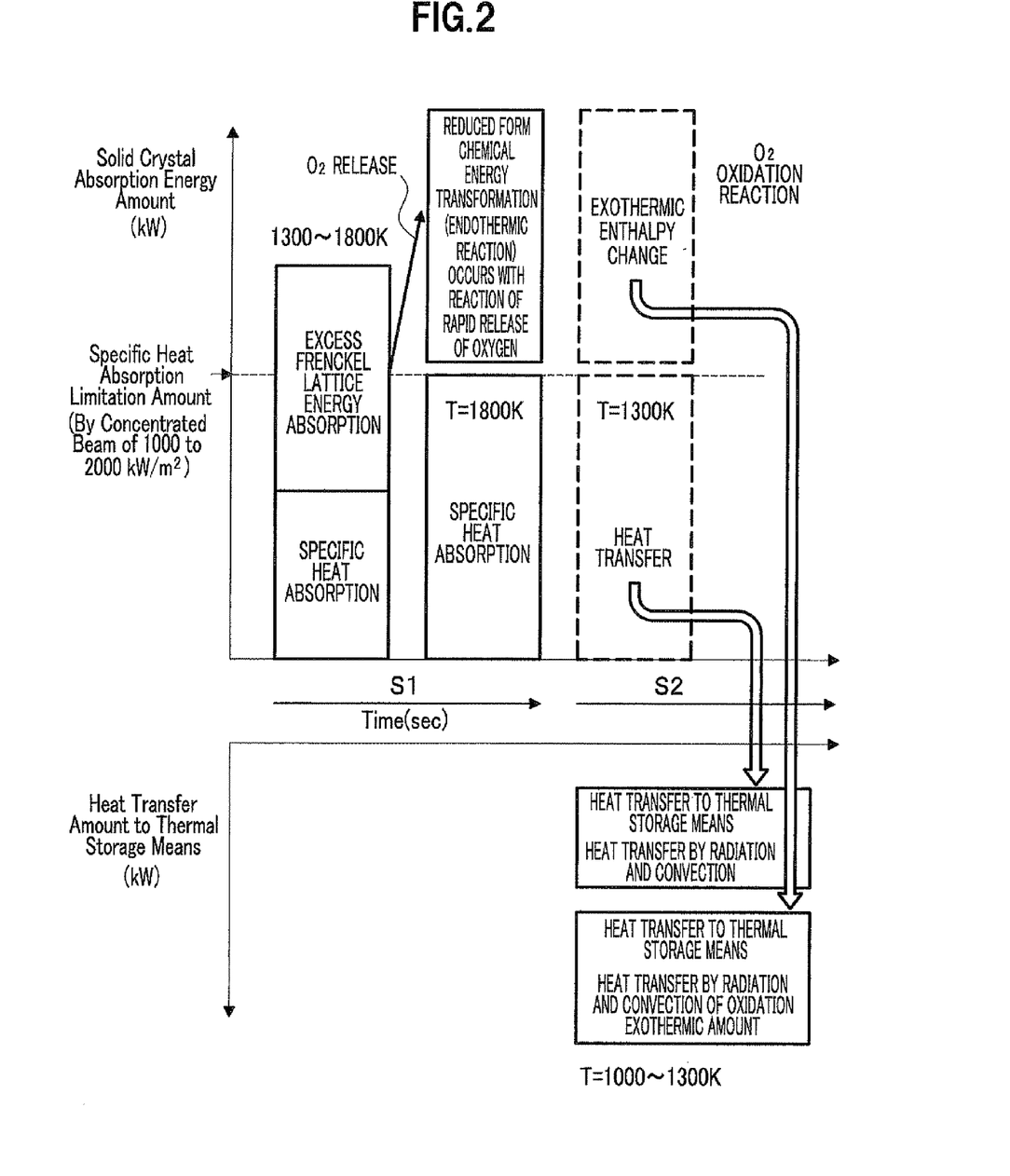
FIG. 2 is an explanatory diagram for explaining the outline of reaction and heat transfer.

In the solar thermal storage method according to the embodiment described above, the reaction and the heat transfer as shown in FIG. 2 are performed between the concentrated beam, the reactive ceramics layer, and the thermal storage means according to the respective steps described above.

First, as shown in FIG. 2, in the primary stage of the concentrated beam irradiation step S1, specific heat is absorbed up to the specific heat absorption limitation amount (1800 K) by the concentrated beam of 1000 to 2000 kW/m$^2$. At the same time, the energy of the concentrated beam is absorbed by a non-equilibrium Frenckel defect phenomenon.

The phenomenon refers to a chemical reaction in terms of coordination changes in the solid lattice structure, which proceeds as an endothermic reaction with a high enthalpy change, i.e., a non-equilibrium state in the Frenckel defect structure. Therefore, the reaction can absorb the energy of the concentrated beam with the high enthalpy change of a reaction material. In addition, since the step is an anion (or cation) movement in the lattice structure, the chemical reaction in the step is assumed to proceed in accordance with the concentrated beam energy absorption. Note that the non-equilibrium state in the Frenckel structure in the chemical reaction is formed after the absorption of high flux energy.

As the temperature of the reactive ceramics reaches about 1800 K, the reaction rate of O$_2$ gas formation from the lattice oxygen (O$^{2-}$) becomes large. Further, the energy absorbed by the non-equilibrium Frenckel defect structure (oxygen vacancy formation) is transformed to the chemical energy of the reduced form of the material generated with the O$_2$ gas release reaction. That is, reduced form chemical energy transformation (endothermic reaction) occurs with the reaction of the rapid release of oxygen (see FIG. 2).

In other words, in the concentrated beam irradiation step S1, the concentrated beam is absorbed by the reactive ceramics and then transformed to the chemical energy of the reduced form of the ceramics material.

Next, in the thermal storage step S2, the reactive ceramics transformed to the reduced form in the previous step is oxidized so as to generate heat by O$_2$ gas supplied in this thermal storage step S2 (exothermic reaction). The oxidation reaction takes place at about 1400 to 1600 K lower by 200 to 400 K than the concentrated beam irradiation step S1. Note that the enthalpy changes with the exothermic reaction (exothermic enthalpy change) (see FIG. 2).

In the thermal storage step S2, the heat corresponding to a decrease in the temperature from 1800 K to 1300 K out of the specific heat absorption of the reactive ceramics, i.e., the heat of 500 K is transferred to the thermal storage means by the radiation and the convection of the reactive ceramics layer. At the same time, the heat corresponding to the exothermic enthalpy change contained in the reactive ceramics layer is transferred to the thermal storage means by the radiation and the convection (see FIG. 2). As a result, the heat of about 1000 to 1300 K is stored in the thermal storage means.

Since the process returns to the concentrated beam irradiation step S1 after the thermal storage step S2, the reactive ceramics layer heated by the concentrated beam is continuously subjected to the same chemical reaction (reduced reaction accompanied by heat absorption and oxidation reaction accompanied by heat generation) as described above.

A description will be given in detail of the outline described above taking as an example a case in which Ni-ferrite is used as the reactive ceramics and graphite is used as the thermal storage material of the thermal storage means.

The reactive ceramics layer irradiated with the concentrated beam in the concentrated beam irradiation step S1 is heated to about 1300 to 1800 K. In a case in which Ni-ferrite is used as the reactive ceramics, the enthalpy change in the Frenckel defect structure of magnetite (Fe$_3$O$_4$) for cation movement into the interstitial site is considered to be 754 kJ/mol, which is nearly the same as that of Ni-ferrite.

Note that when the reactive ceramics layer is irradiated with the high flux concentrated beam of Xe lamp light to be heated to 1800 K and the O$_2$ gas is released from the Ni-ferrite, the density (separated oxygen ion number/total oxygen ion number) of the N-ferrite at 1800 K is 0.28 (0.42 mol/one mol of iron). Therefore, the energy of the concentrated beam that can be absorbed by one mol of the Ni-ferrite is 317 kJ/mol. Note that the thermal conductivity of the Ni-ferrite gives a value close to the metallic conductivity of metal at 1800 K from conductivity measurement. In addition, the enthalpy change in the oxidation of FeO to Fe$_3$O$_4$ is 340 kJ/mol.

Accordingly, based on these figures of the parameters, the heat equilibrium is attained in the thermal storage step S2 between 1500 K of the reactive ceramics (Ni-ferrite) and 1273 K of the thermal storage material (graphite with the metallic conductivity of 800 W/m·K) (heat sink temperature T=600 K), and the 1400 kW/m$^2$ of heat flux is transferred in the thermal storage step S2. Note that in this case, the thermal gradient zone length is estimated 0.8 m.

In addition, the reaction of the concentrated beam irradiation step S1 rapidly progresses, while the reaction of the thermal storage step S2 moderately progresses. Accordingly, when the ratio of the area of the reactive ceramics layer is set such that the area of the thermal storage step S2 becomes greater than that of the concentrated beam irradiation step S1, the heating of the concentrated beam irradiation step S2 and the heat transfer of the thermal storage step S2 are well balanced. When the area ratio of the area of the concentrated beam irradiation step S1 to that of the thermal storage step S2 is 1:5, the heat can be stored for 12 hours in thermal storage means (circular cylinder; 5 m² area×16 m height) having a thermal storage capacity of 1.4 MW with the graphite (20 J/K/mol of the heat capacity) as a thermal storage material in the case of the 1400 kW/m² of the concentrated beam.

In a case in which the power of a solar plant is 100 MW, a focus area subjected to the concentrated beam irradiation step S1 is 71 m² at the mean flux magnitude of 1400 kW/m². In this case, the thermal storage means that allows 12-hour thermal storage has a diameter of 10.6 m and a height of 16 m.

Thus, when Ni-ferrite and metallic graphite are used as reactive ceramics and a thermal storage material, respectively, the solar thermal storage method capable of supplying the heat of about 1000 to 1300 K to an external facility for 24 hours with a simple configuration can be realized by the adoption of the reactive ceramics using the absorption of concentrated beam energy with a non-equilibrium Frenckel defect structure.

[Solar Thermal Storage System]

Hereinafter, referring to FIG. 3, a description will be given of an embodiment of a solar thermal storage system that realizes the solar thermal storage method including the respective steps described above.

Figure 3:
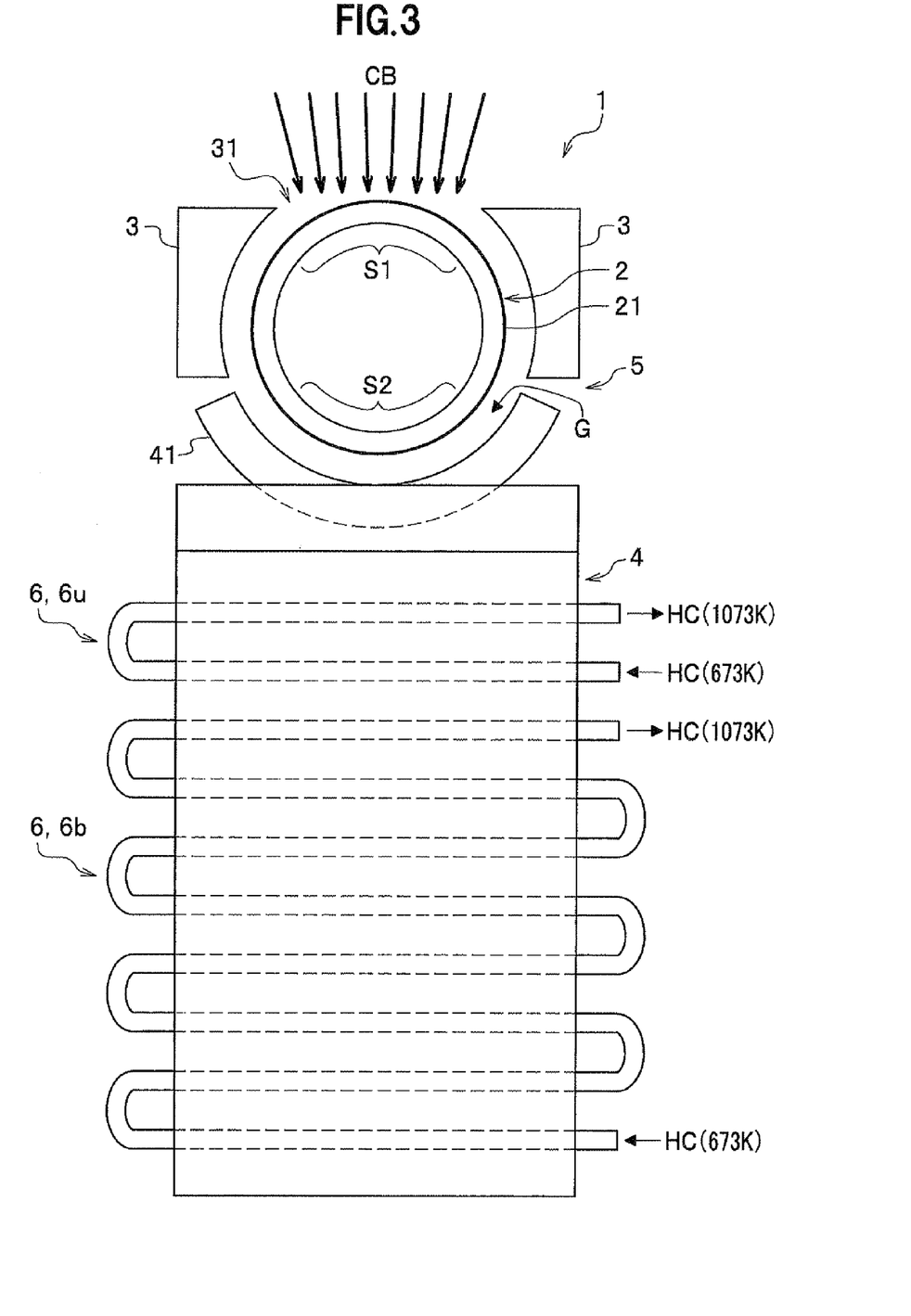
FIG. 3 is a configuration diagram showing the configuration of a solar thermal storage apparatus according to an embodiment of the present invention.

As shown in FIG. 3, a solar thermal storage system 1 according to the embodiment of the present invention includes a rotation body 2, drive means (not shown) for rotating the rotation body 2 in the peripheral direction, a heat insulation member 3, thermal storage means 4, and gas supply means 5.

(Rotation Body)

As described in the concentrated beam irradiation step S1, the rotation body 2 is preferably formed into a cylindrical shape. On the outer peripheral surface of the rotation body 2, a reactive ceramics layer 21 is formed using the reactive ceramics described above. The thickness of the reactive ceramics layer 21 is not particularly limited but may be, e.g., 2 mm or the like.

The rotation body 2 is more preferably formed of alumina fibers. The alumina fibers have less thermal shrinkage, excellent strength, and heat insulation performance. Therefore, even when the reactive ceramics layer 21 is irradiated with a high flux concentrated beam CB and heated, the alumina fibers hardly release the heat (i.e., they hardly lose the heat). For this reason, the alumina fibers are preferable. Note that the reactive ceramics layer 21 is heated to about 1800 K by the concentrated beam CB. For example, the rotation body 2 can have a length of about 1 to 5 m and a diameter φ of about 1 m or the like.

(Drive Means)

The drive means (not shown) can include but not limited to, e.g., an electric motor, a steam turbine, or the like, and any means can be used so long as it is allowed to exhibit a drive force to drive the rotation body 2 in the peripheral direction.

(Heat Insulation Member)

The heat insulation member 3 is provided such that the reactive ceramics layer 21 having been irradiated with the concentrated beam CB and heated is prevented from decreasing its temperature until the heat is transferred to the thermal storage means 4 described later and that the reactive ceramics layer 21 having transferred the heat to the thermal storage means 4 is prevented from decreasing the temperature. Therefore, the heat insulation member 3 is provided so as to cover the outer peripheral surface of the rotation body 2.

In addition, the heat insulation member 3 is provided with an opening part 31 that allows the rotation body 2 to be irradiated with the concentrated beam CB. That is, the upper end portion of the rotation body 2 at which the concentrated beam CB is irradiated is exposed from the heat insulation member 3.

Examples of the heat insulation member 3 can include aluminum wool, glass wool, rock wool, ceramic cloth, or the like.

(Thermal Storage Means)

The thermal storage means 4 is provided close to the rotation body 2 at a position distant from the opening part 31 of the heat insulation member 3. Note that since the temperature of the reactive ceramics layer 21 heated by the concentrated beam CB is as high as about 1800 K and the mechanical strength thereof is reduced, the reactive ceramics layer 21 is not preferably in contact with the thermal storage means 4. By the heat transfer from the rotation body 2, the heat of about 1300 K is stored in the thermal storage means 4.

As described in the thermal storage step S2, the thermal storage means 4 is preferably formed using a thermal storage material formed of at least one of, e.g., a carbon material and salt. With the use of such materials, thermal shrinkage and deformation hardly occur in the thermal storage means 4 even at high temperature and thus the thermal storage means 4 is easily handled. As described above, examples of the carbon material can include graphite, carbon composite, or the like. In addition, examples of the salt can include NaCl, rock salt, or the like. Note that in the case of using the carbon material, the carbon material is not preferably in contact with oxygen to prevent combustion. In order to realize this, for example, a sealed vessel that accommodates the carbon material is evacuated or filled with an inert gas such as helium and argon.

Note that a top part 41 of the thermal storage means 4, which is provided close to the rotation body 2 and receives the heat from the rotation body 2, is preferably formed of a material having particularly good thermal conductivity and excellent in oxidation resistance. Examples of such a material can include aluminum nitride, silicon nitride, silicon carbide, carbon ceramics, or the like.

(Gas Supply Means)

The gas supply means 5 supplies gas containing oxygen to the rotation body 2. The gas supply means 5 can be provided at any position in the middle of an interval until the rotating rotation body 2 reaches the thermal storage means 4 after passing through the opening part 31.

The gas supply means 5 can be composed of, e.g., an air pump (not shown) and a nozzle (nozzle) connected to the air pump and having a blowing port directed to the reactive ceramics layer 21. Since the gas containing oxygen supplied by the gas supply means 5 is described above, the description thereof will be omitted.

(Heat Extraction Means)

The thermal storage means 4 preferably includes heat extraction means 6 for circulating a heating medium HC to extract the heat stored in the thermal storage means to the outside of the thermal storage means 4. Note that specific examples of the outside can include an external facility such as a facility that reforms natural gas and methane gas and a gas turbine power generation facility.

Examples of the heat extraction means 6 can include a heat exchanger. Specifically, the heat stored in the thermal storage means 4 can be suitably extracted to the external facility when the heating medium circulates inside a hollow pipe that penetrates the thermal storage means 4. The number of the hollow pipes can be arbitrarily set. In addition, the hollow pipe is preferably folded a plurality of times as required such that the heating medium HC can circulate inside the thermal storage means 4 a plurality of times. In this manner, the heat of the thermal storage means 4 can be sufficiently extracted to the outside of the thermal storage means 4. Note that air, molten salt, or the like can be used as the heating medium HC. As the molten salt, carbonate (sodium, potassium, calcium, magnesium), a carbonate mixture, or the like can be used.

The heat extraction means 6 may be divided into, e.g., the two regions of the top and bottom zones of the thermal storage means 4, and operate the top zone during the daytime and the bottom zone during the nighttime. In addition, in the case of the heat extraction means 6 (heat exchanger) that uses the hollow pipe described above, the laying distance of the hollow pipe provided at the top zone may be shorter than that of the hollow pipe provided at the bottom zone. Note that the circulation rate of the heating medium HC inside the hollow pipe in the top zone and that of the heating medium HC inside the hollow pipe in the bottom zone can be arbitrarily set. In addition, by the control of the circulation rate of the heating medium HC, the heat equilibrium between the reactive ceramics layer 21 and the thermal storage means 4 can be controlled. For example, the temperature of the thermal storage means 4 can be increased by the deceleration of the circulation rate of the heating medium HC and can be decreased by the acceleration of the circulation rate of the heating medium HC.

During the daytime, the amount of the heat transferred from the rotation body 2 is extremely large, and the temperature is high. Accordingly, the heat can be sufficiently supplied to the external facility even by heat extraction means 6u in the top zone in which the laying distance of the hollow pipe is short. Since the amount of the heat transferred from the rotation body 2 is extremely large and the temperature is high during the daytime, the heat cannot be entirely supplied to the external facility by the heat extraction means 6u in the top zone and thus the excessive amount of the heat is transferred to the bottom zone of the thermal storage means 4. Accordingly, the heat of about 1300 K is also stored in the bottom zone of the thermal storage means 4. That is, the heat extraction means 6u in the top zone can perform the use and storage of the heat at the same time. Therefore, during the nighttime, the heat extraction means 6b in the bottom zone is operated, and the heat stored in the bottom zone of the thermal storage means 4 can be supplied to the external facility.

The heat extraction means 6 may not be divided into the two regions of top and bottom zones unlike the above, but may be single or may be divided into 3 or more. The division of the heat extraction means 6 can be arbitrarily set.

With the thermal storage means 4 and the heat extraction means 6 thus configured, the molten salt of, e.g., about 673 K is, when introduced into the heat extraction means 6, heated (heat-exchanged) to about 1000 to 1300 K, e.g., about 1073 K via the thermal storage means 4. Accordingly, the heat of about 1000 to 1300 K can be supplied to the external facility.

EXAMPLES

Hereinafter, a description will be given of examples by which the effect of the present invention was confirmed.

An examination was conducted based on a 2-D model using COMSOL Multiphysics 3.5a about thermal storage using the solar thermal storage system 1 (in which the thermal storage means 4 has a diameter φ of 1.0 m and a height of 10.0 m) having the configuration shown in FIG. 3. A governing equation is given by the following formula (1).

[Formula 1]

$$\rho C_p \frac{\partial T}{\partial t} - \nabla \cdot (k \nabla T) = Q_{out} \quad (1)$$

Here, ρ represents density, $C_p$ represents specific heat, T represents temperature, t represents time, k represents thermal conductivity, and $Q_{out}$ represents the amount of heat transferred. The boundary conditions of the top part 41 of the thermal storage means 4 formed using graphite are given by the following formula (2).

[Formula 2]

$$n \cdot (k \nabla T) = Q_{in} + h_{conv}(T_{ext} - T) + \sigma \omega (T_{amb}^4 - T^4) \quad (2)$$

Here, $Q_{in}$ represents oxidation heat in the solar heat release room (between the rotation body 2 and the top part 41 of the thermal storage means 4, the same applies to the following) of the reactive ceramics, $h_{conv}$ represents the absorption efficiency of the front surface, ω represents convective heat transfer coefficient inside the solar heat release room, σ represents the Stefan-Boltzmann factor, and $T_{amb}$ represents average temperature inside the solar heat release room of the reactive ceramics of the rotation body 2.

Other boundary conditions are that the periphery is heat-insulative and the temperature of the bottom zone of the thermal storage means 4 formed using graphite is 600° C. In addition, the parameters of the model used for the calculation are shown in Table 1.

TABLE 1

| Name | Expression | Calculation Domain | Unit | Description |
|---|---|---|---|---|
| Qout | −alpha * (T − Tfluid) | T > Tfluid | W/m³ | Heat taken by molten salt |
| alpha | 1000 | y > 8 | W/m³/K | Heat transfer coefficient between molten salt and graphite |
| Tfluid | (Tout − Tin) * (y − 8)/2 + Tin | y > 8 | K | Temperature of fluid as a function of height |
| Tinitial | 673 | | K | Initial temperature of the system |
| Tin | 673 | | K | Inlet temperature of molten salt |
| Tout | 1073 | | K | Outlet temperature of molten salt |
| Text | 373 | | K | Gas temperature inside the cavity |
| Tamb | 673 | | K | Temperature of the cavity wall |

In addition, physical constants are shown in Table 2.

TABLE 2

| Name | Value | Unit | Description |
| --- | --- | --- | --- |
| Qin | 1400000 | $W/m^2$ | Calorification energy by oxidation |
| k_graphite | 2000 | W/m/K | Thermal conductivity of graphite |
| rho_graphite | 2210 | $kg/m^3$ | Density of graphite |
| C_graphite | 1400 | J/kg/K | Heat capacity of graphite |
| h_conv | 15 | $W/m^2/K$ | Convective heat transfer coefficient of the surface |
| omega | 0.3 | | Effective emissivity of the surface |
| sigma | 5.67E−08 | $W/m^2/K^4$ | Stefan-Boltzmann constant |

Figure 4:
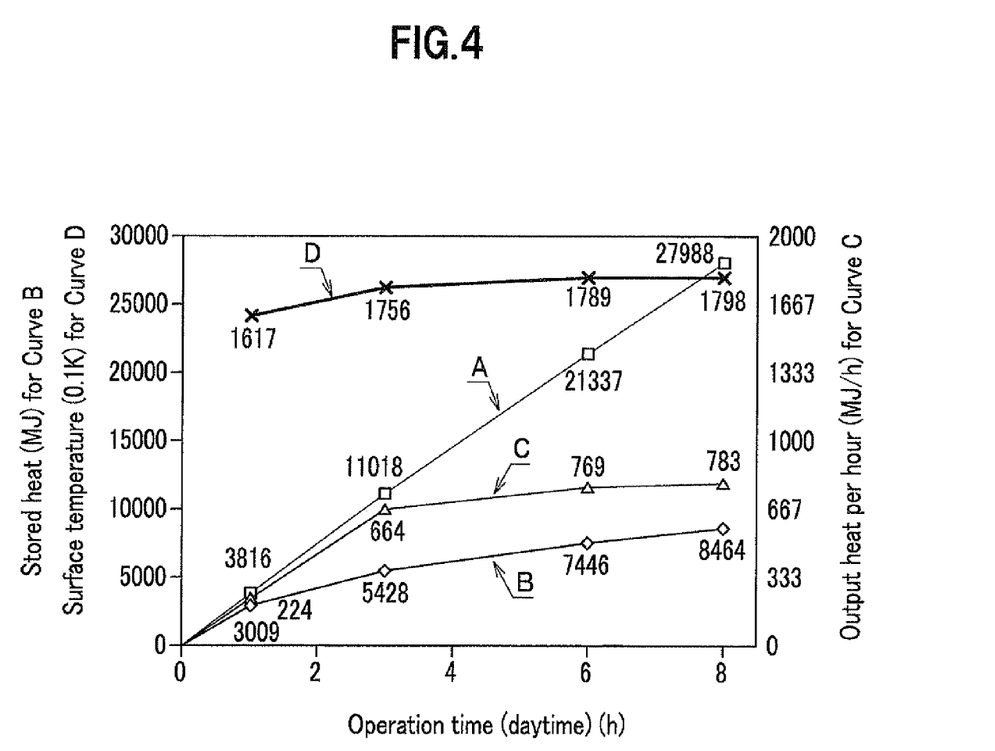
FIG. 4 is a graph showing the simulation results of an 8-hour operation under a daytime mode, in which the horizontal axis represents operation time (daytime) (hour), the first vertical axis represents the cumulated amount of stored heat (MJ) (curve B) and the temperature of stored heat (0.1 K) (curve D), and the second vertical axis represents the amount of output heat per hour (kJ/h) (curve C)

FIG. 4 shows the results of an 8-hour operation ($Q_{in}$=1300 $kW/m^2$, $k_{graphite}$=2000 W/m/K, α; thermal conductivity of graphite=1000 $W/m^3/K$, inlet temperature=673 K, outlet temperature=1073 K) under a daytime mode.

In FIG. 4, curve A represents the (cumulated) amount of the absorbed solar heat (MJ) (the amount of the heat in the solar heat release room). Curve B represents the cumulated amount of the heat (MJ) stored in the thermal storage means 4 formed using graphite. Curve C represents the amount of the output heat (kJ/h) by the heating medium HC that operates at 400 to 800° C. (673 to 1073 K). Curve D represents the temperature (K) of the top part 41 of the thermal storage means 4 formed using graphite.

As apparent from the curve C, the amount of the heat extracted by the heating medium HC is 1800 to 2000 MJ/h (for 3 to 5 hours) and 2500 MJ/h (for 6 to 8 hours). In addition, as seen in the curves B and C, the amount of the heat stored for 1 to 2 hours comes substantially close to saturation, and the amount of the heat extracted for the 3-hour operation reaches 1700 MJ/h.

In the case of the normal operation with 1700 to 2500 MJ/h (0.47 to 0.69 MW) for 1 to 2 hours at the start-up, it is suitably supported by natural gas or the like. After the 8-hour operation in the daytime, the heat of 10320 MJ is stored. In addition, the temperature of the top part 41 of the thermal storage means 4 formed using graphite is 1500 to 1550° C. (curve D).

Figure 5:
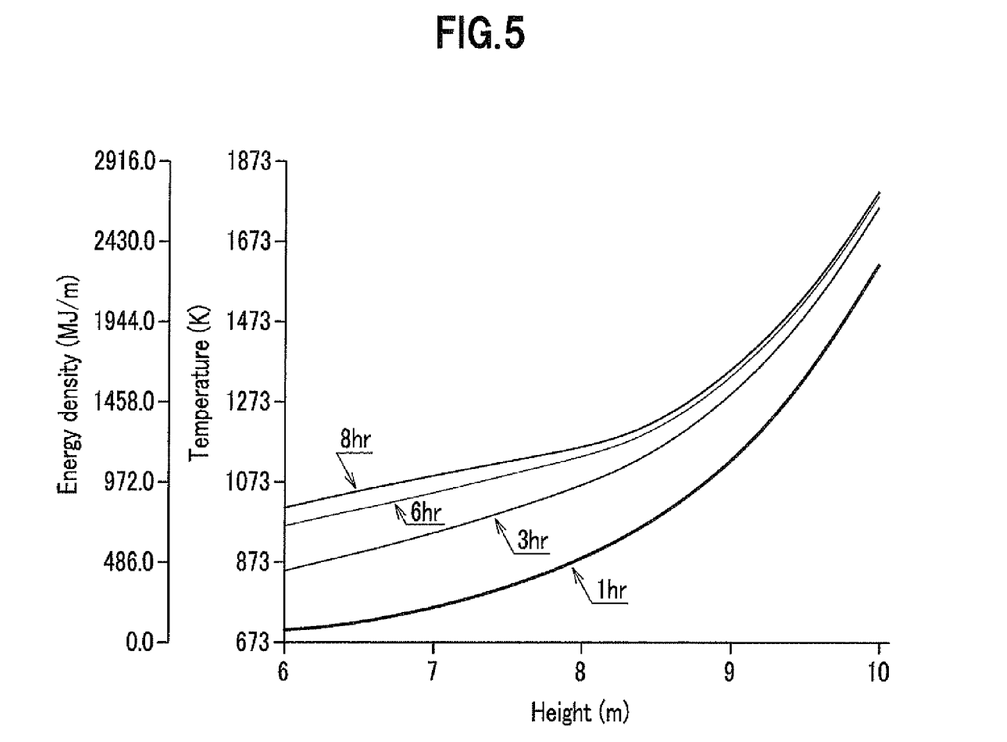
FIG. 5 is a graph showing the relationship between temperature distribution (K) and stored heat amount distribution (MJ/m) relative to the height of a thermal storage tank, in which the horizontal axis represents the height (m) and the vertical axis represents the temperature distribution (K) and the stored heat amount distribution (MJ/m)

FIG. 5 shows, for each operation time under the daytime operation mode, temperature distribution (K) and stored heat amount distribution (MJ/m) inside the thermal storage means 4 relative to the height of the thermal storage means 4 formed using graphite. The height range of the thermal storage means 4 for use in thermal storage is 6 to 8 m, and the entire height of the thermal storage means 4 is 10 m. For the daytime operation of 1 to 3 hours, the temperature increases by about 200° C. at the height range of 6 to 8 m.

In addition, the temperature increases by about 100° C. at the height range of 9 to 10 m. After the 6-hour operation, the temperature distribution and the stored heat amount distribution inside the thermal storage means 4 become nearly constant, and the stored heat amount under the daytime operation mode nearly reaches saturation.

After the 8-hour operation, the average amount of the stored heat becomes 8464 MJ, and the temperature becomes 1000° C. (about 1300 K). After sunset, the temperature gradient inside the thermal storage means 4 is gradually relaxed, and the temperature of the top part 41 of the thermal storage means 4 comes close to 1000° C. This suggests that the outlet temperature of the heating medium HC can be kept at about 800° C. (about 1073 K) even in the nighttime operation. According to the calculation results at this time, the inlet temperature of the heating medium HC was at 400° C. (about 673K), and the amount of the heat for 8464 MJ was extracted in this case. Assuming that 6000 MJ for about 70% of the amount of the heat can be extracted, the heat flow amount per hour is 1700 MJ/h (0.47 MW) by which the 4-hour operation is made possible. The amount of the heat can be increased with an increase in the thermal storage area as described below. In addition, the 24-hour operation at high temperature is also possible.

The simulation results described above can give the following evaluation.

From the simulation results in which practicable and operable temperature and the size of the thermal storage means 4 were evaluated, the calculation results show that the size of the thermal storage means 4 is required to be 6 $m^3$ (having a diameter φ of 1 m and a height of 8 m) so as to realize 1 MW as the solar thermal storage system that stores the heat for 4 hours.

Base on this, by paying attention to the fact that a tower top concentrating system (GEMA solar) of a 24-hour thermal storage type is commercially operated as a concentrated solar heat plant, provisional calculation was made under the amount of the concentrated heat of 100 MW (the amount of the stored heat of 60 MW) as the scale of the plant and the thermal storage of 12 hours. In the case of the thermal storage means 4 formed using graphite, it was provisionally calculated that the thermal storage means 4 has a diameter φ of 13.5 m, a height of 8 m, and a volume of 1100 $m^3$. It is inferred that the sizes are reasonable as the scale of an actual thermal storage tank.

In addition, where a beam-down solar light concentrating system is as high as 100 MW, the concentrated beam CB on the ground has a diameter of 10 to 15 m. If the focal position from the ground is raised correspondingly in consideration of the height of the thermal storage tank (thermal storage means 4), the size of the diameter is further reduced. In view of the above, in the case of the 100 MW beam-down solar light concentrating system, it is substantially reasonable that the thermal storage means 4 formed using graphite has a diameter of 13.5 m in the solar thermal storage system 1 according to the present invention in which the rotation body 2 having the reactive ceramics layer 21 formed thereon is directly irradiated with the concentrated beam CB to store the heat in the thermal storage means 4.

In the simulation results described above, the thermal conductivity of the graphite was 2000 W/m/K. Although a thermal conductivity of 1000 to 100 W/m/K may have to be applied, there are some carbon composites and nanotubes to which the numerical value in this time can be applied. Actually, a composite of 500 W/m/K is industrially available. In addition, instead of using a material having such a high conductivity, it is possible to forcibly move the input heat in the top zone of the thermal storage means 4 to the middle zone of the thermal storage means 4 by the modification of the structure and mechanism of a heat exchange system. In combination with these, it is only required to select the best thermal conductivity material. In addition, if such an application is examined in various ways, it is also possible to further reduce the capacity per se of the thermal storage means 4. The thermal storage capacity is increased correspondingly, which results in cost reduction.

Since the beam-down solar light concentrating system can reproduce the concentrated beam CB near the ground, it has an excellent characteristic in that it can directly heat a heavy and large thermal storage facility placed on the ground.

As described above, the solar thermal storage method and the solar thermal storage system 1 according to the present invention can provide a technology based on solar heat that allows a 24-hour operation at high temperature and high efficiency by the unique configuration in which the beam-down solar light concentrating system and the rotation body 2 having the reactive ceramics layer 21 formed thereon are combined together.

EXPLANATION OF REFERENCES

S1: concentrated beam irradiation step
S2: thermal storage step
1: solar thermal storage system
2: rotation body
21: reactive ceramics layer
3: heat insulation member
31: opening part
4: thermal storage means
41: top part
5: gas supply means
6: heat extraction means
6*u*: heat extraction means in top zone
6*b*: heat extraction means in bottom zone
CB: concentrated beam

I claim:

1. A solar thermal storage method for storing heat from solar light energy using a reactive ceramics layer that is moved to pass alternately a first position and a second position different from the first position, wherein the reactive ceramics layer is made of reactive ceramics that transform from an oxidized form to a reduced form releasing oxygen thereof when heated and transform from the reduced form to the oxidized form generating heat when brought into contact with oxygen, the solar thermal storage method comprising:
    a concentrated beam irradiation step of irradiating the reactive ceramics layer at the first position with a concentrated beam obtained by concentrating solar light to heat the reactive ceramics layer and transform from the oxidized form to the reduced form; and
    a thermal storage step of storing in a thermal storage means the heat emitted from the reactive ceramics layer at the second position where the reactive ceramics layer heated in the concentrated beam irradiation step is brought into contact with gas containing oxygen, and emits the heat and transforms from the reduced form to the oxidized form, wherein
    the concentrated beam irradiation step and the thermal storage step are performed repeatedly on the reactive ceramics layer.

2. The solar thermal storage method according to claim 1, comprising:
    a heat extraction step of circulating a heating medium to extract the heat stored in the thermal storage means to an outside of the thermal storage means after the thermal storage step.

3. A solar thermal storage system for storing heat using solar light energy, the solar thermal storage system comprising:
    a rotation body having a reactive ceramics layer formed on a front surface thereof, the reactive ceramics layer being formed using reactive ceramics that transforms from an oxidized form to a reduced form with a release of oxygen when heated and returns to the oxidized form when brought into contact with the oxygen;
    drive means for rotating the rotation body in a peripheral direction;
    a heat insulation member provided so as to cover an outer peripheral surface of the rotation body and having an opening part that allows the rotation body to be irradiated with a concentrated beam obtained by concentrating solar light;
    thermal storage means provided close to the rotation body at a position distant from the opening part; and
    gas supply means for supplying gas containing the oxygen to the rotation body, the gas supply means being provided any position in a middle of an interval until the rotating rotation body reaches the thermal storage means after passing through the opening part.

4. The solar thermal storage system according to claim 3, wherein
    the reactive ceramics layer is formed of nickel ferrite.

5. The solar thermal storage system according to claim 3, wherein
    the thermal storage means comprises heat extraction means for circulating a heating medium to extract the heat stored in the thermal storage means to an outside of the thermal storage means.

6. The solar thermal storage system according to claim 4, wherein
    the thermal storage means comprises heat extraction means for circulating a heating medium to extract the heat stored in the thermal storage means to an outside of the thermal storage means.

7. The solar thermal storage system according to any one of claims 3 to 6, wherein
    the rotation body is a cylindrical body formed of alumina fibers.

8. The solar thermal storage system according to any one of claims 3 to 6, wherein
    the thermal storage means is formed using a thermal storage material formed of at least one of a carbon material and salt.

9. The solar thermal storage system according to claim 7, wherein
    the thermal storage means is formed using a thermal storage material formed of at least one of a carbon material and salt.

* * * * *